US009554172B2

(12) United States Patent
Sakata et al.

(10) Patent No.: US 9,554,172 B2
(45) Date of Patent: Jan. 24, 2017

(54) REBROADCASTING SYSTEM (71) Applicant: HITACHI KOKUSAI ELECTRIC INC., Tokyo (JP)

(72) Inventors: Satoshi Sakata, Tokyo (JP); Nobuo Hirose, Tokyo (JP); Jun Abe, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/775,498

(22) PCT Filed: Feb. 27, 2014

(86) PCT No.: PCT/JP2014/054888
§ 371 (c)(1),
(2) Date: Sep. 11, 2015

(87) PCT Pub. No.: WO2014/167909
PCT Pub. Date: Oct. 16, 2014

(65) Prior Publication Data
US 2016/0037198 A1 Feb. 4, 2016

(30) Foreign Application Priority Data
Apr. 10, 2013 (JP) ................................. 2013-082165

(51) Int. Cl.
*H04N 7/20* (2006.01)
*H04N 21/262* (2011.01)
(Continued)

(52) U.S. Cl.
CPC ............ *H04N 21/262* (2013.01); *G11B 27/10* (2013.01); *H02J 7/35* (2013.01); *H02S 40/38* (2014.12);
(Continued)

(58) Field of Classification Search
USPC ............ 725/63; 320/101, 133; 136/291, 293
See application file for complete search history.

(56) References Cited

U.S. PATENT DOCUMENTS

| 2005/0210512 A1* | 9/2005 | Anderson | H04H 20/61 725/62 |
| 2012/0063508 A1* | 3/2012 | Hattori | H04N 21/23614 375/240.01 |
| 2015/0222374 A1* | 8/2015 | Kitazato | H04H 60/43 370/312 |

FOREIGN PATENT DOCUMENTS

| JP | 06-066199 U | 9/1994 |
| JP | 09-107600 A | 4/1997 |
| JP | 2010-118903 A | 5/2010 |

OTHER PUBLICATIONS

Akira Keida, "Nishi Africa Mali Kyowakoku no Hoso Jijo", Broadcast Engineering, Dec. 1, 1999, (Dec. 1, 1999), vol. 52, No. 12, pp. 1427 to 1438.

(Continued)

*Primary Examiner* — Pankaj Kumar
*Assistant Examiner* — Charles N Hicks
(74) *Attorney, Agent, or Firm* — Harness, Dickey & Pierce, PLC (57) ABSTRACT

A rebroadcasting system for retransmitting a television broadcast, which was received from a satellite, in a segment broadcasting, such as one-segment broadcasting and three-segment broadcasting, comprises: charging a solar battery during the daytime; recording broadcasts during the retransmission halt time; retransmitting television broadcasts, which are received from the satellite, in real time by use of central (one or three) segments and the charged power during any time when the output of the solar battery is low, for example, during the night, before sunset, after sunrise, or a rainy day; reproducing the recorded broadcasts; and (Continued)

retransmitting the reproduced recorded programs by use of any remaining segments, for example, segments adjacent to the central segments.

6 Claims, 6 Drawing Sheets

(51) Int. Cl.

| | |
|---|---|
| *H04N 21/234* | (2011.01) |
| *H04N 21/2365* | (2011.01) |
| *H04N 21/222* | (2011.01) |
| *H04N 21/231* | (2011.01) |
| *H04H 20/40* | (2008.01) |
| *H04H 20/63* | (2008.01) |
| *H02S 40/38* | (2014.01) |
| *G11B 27/10* | (2006.01) |
| *H02J 7/35* | (2006.01) |
| *H04N 21/61* | (2011.01) |
| *H04N 21/845* | (2011.01) |
| *H04N 21/426* | (2011.01) |
| *H04N 21/434* | (2011.01) |

(52) U.S. Cl.
CPC ............. *H04H 20/40* (2013.01); *H04H 20/63* (2013.01); *H04N 21/222* (2013.01); *H04N 21/231* (2013.01); *H04N 21/234* (2013.01); *H04N 21/2365* (2013.01); *H04N 21/26241* (2013.01); *H04N 21/42676* (2013.01); *H04N 21/4344* (2013.01); *H04N 21/6143* (2013.01); *H04N 21/8456* (2013.01)

(56) References Cited

OTHER PUBLICATIONS

Masayuki Hirata, "Bhutan Okoku no Shakai to Hoso (Sono 2)", Broadcast Engineering, Mar. 1, 2005, (Mar. 1, 2005), vol. 58, No. 3, pp. 286 to 292.
International Search Report for PCT/JP2014/054888 (in English and Japanese), mailed Mar. 25, 2014; ISA/JP.

\* cited by examiner

REBROADCASTING SYSTEM

CROSS REFERENCE TO RELATED APPLICATIONS

This application is a U.S. National Phase Application under 35 U.S.C. 371 of International Application No. PCT/JP2014/054888 filed on Feb. 27, 2014 and published in Japanese as WO 2014/167909 A1 on Oct. 16, 2014. This application is based on and claims the benefit of priority from Japanese Patent Application No. 2013-082165 filed Apr. 10, 2013. The entire disclosures of all of the above applications are incorporated herein by reference.

TECHNICAL FIELD

The present invention relates to a technique suitably used for a rebroadcasting system that retransmits a broadcast wave having broadcast data carried on a prescribed segment (frequency), and covers an area (for example, an island of Indonesia) where no mains power supply is provided.

BACKGROUND ART

Here, a concept of a segment for a particular frequency in a transmission channel of digital terrestrial broadcasting ISDB-T (Integrated Services Digital Broadcasting-Terrestrial) is described.

Figure 3:
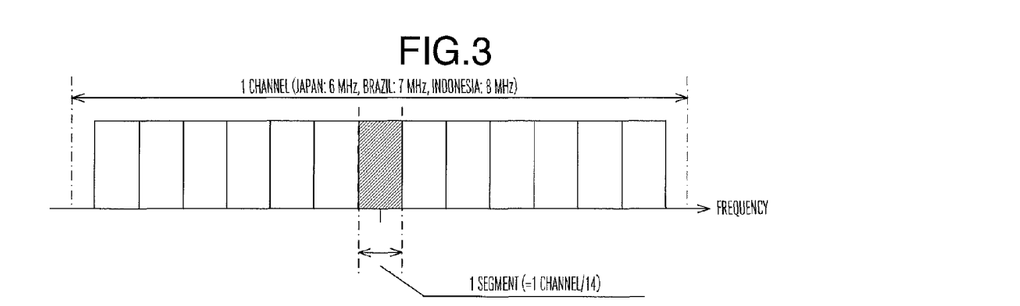
FIG. 3 is a schematic view of a digital terrestrial broadcast channel of an ISDB-T system.

As shown in FIG. 3, in a channel of digital terrestrial broadcasting (13 segments having each 6 MHz in Japan divided into 14 and each 0.5 segment at both ends used as a guard band in the shown example), a one-segment broadcast wave provides broadcasting services by emitting a broadcast wave with broadcast data such as H.264 compressed video information carried by QPSK (Quadrature Phase Shift Keying) of one segment (segment number 0). Receivers of one-segment broadcasting used for broadcasting or the like for portable terminals receive the broadcast wave of the segment number 0 to receive video, audio and data. Each 6 segments (a total of 12 segments) at both sides are used to perform MPEG2 compressed HDTV (High Definition TeleVision: high definition television) broadcasting by 64QAM (Quadrature Amplitude Modulation).

There are also SDTV (Standard Definition TeleVision) educational television broadcasting of 4 segments resulting from dividing 12 segments into three and so-called digital radio broadcasting (digital terrestrial audio broadcasting) of 3 segs (3 segments) having 12 segments divided into four.

Here, a method of broadcasting by a partial segment of the number of all segments in transmission channels of broadcasting such as one-segment broadcasting, four-segment broadcasting and three-segment broadcasting is called as a partial segment broadcasting hereinbelow.

And, the partial segment broadcasting such as one-segment broadcasting is suitable for implementation by an SFN (Single Frequency Network) system and implementation by a broadcasting system (area broadcasting) covering a relatively small area by very small transmission power, and further expansion of use in future is expected.

And, one channel is 6 MHz in Japan, 7 MHz in Brazil, and 8 MHz in Indonesia. Japan also has multimedia broadcasting that gathers much more segments.

JP-A-2010-118903 proposes a broadcasting system that can eliminate or reduce dead zones in the area broadcasting by so-called frequency diversity by simultaneously transmitting a signal with the same content in a possible transmission frequency band part other than a usable transmission frequency band to solve a problem that the dead zones are easily caused in a service area by a broadcasting system (area broadcasting) covering a particular area by very small transmission power by use of a one-segment broadcasting system.

In recent years, similar to the area one segment, it is considered to make effective use of a frequency by allotting a service to one central segment only or to individual segments. And, it is also considered overseas that the central segment only is used so to put the retransmission of television broadcasting into practical use. It is specially considered that a solar battery and a one-segment transmission apparatus are installed in combination in overseas villages where no electricity is available to provide services to areas where television broadcasting is not spread sufficiently. Specifically explaining a summary of the system, it has a structure that the solar battery is charged during the daytime, the one-segment transmission apparatus is operated by the charged power during the night, and a television broadcast received from a satellite is retransmitted in real time, so that the television broadcast is enjoyed.

Figure 4:
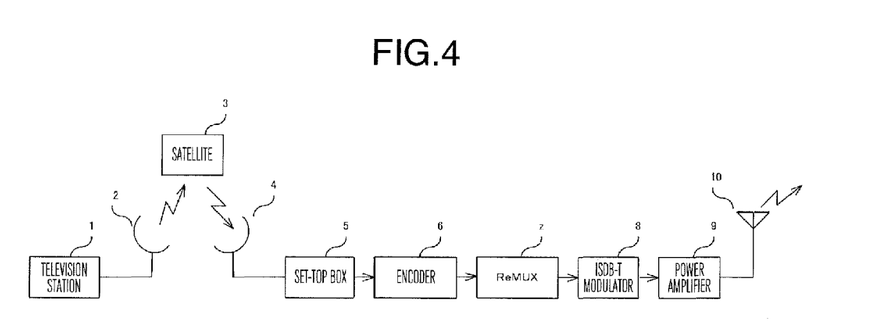
FIG. 4 is a block diagram showing a configuration of a one-segment retransmission system for conventional satellite broadcasting.

FIG. 4 is a block diagram showing a configuration of a one-segment retransmission system for conventional satellite broadcasting. A program is transmitted from a television station 1, and television broadcasting waves are transmitted from an antenna 2 to a satellite 3. The received signals are retransmitted to each region by the satellite and received as television broadcasting by a shared receiving antenna 4 and a set-top box 5. Video and audio of the program obtained by the set-top box are input to an encoder 6 and converted into a signal form (broadcasting TS) conforming to the ISDB-T system by a ReMUX 7. The broadcasting TS is modulated by an ISDB-T modulator 8 and allotted to one central segment of the channel. Thus, the retransmission signal modulated to one segment is transmitted to a one-segment receiving terminal of each home or portable terminals via a power amplifier 9 and a transmitting antenna 10.

In a system for performing retransmission of broadcasting in real time by use of a one-segment transmission apparatus, retransmitting time is limited sometimes. For example, a case that the one-segment transmission apparatus is operated by the solar battery is taken as an example. There is considered a method of retransmitting television broadcasting by charging the solar battery in the daytime and using the power charged during the daytime to activate the one-segment transmission apparatus during the night. By such a retransmission system, television broadcasting cannot be watched during the daytime when the solar battery is charged, and a program was missed sometimes.

SUMMARY OF THE INVENTION

Technical Problem

The present invention aims to rebroadcast broadcast programs in an area, where no mains power supply is provided, even during the nighttime.

Solution to the Problem

To solve the above problem, the present invention is a rebroadcasting system for retransmitting a television broadcast, which was received from a satellite, in a segment broadcasting, such as one-segment broadcasting and three-segment broadcasting, comprising charging a solar battery during the daytime; recording broadcasts during the retransmission halt time; retransmitting television broadcasts, which are received from the satellite, in real time by use of central (one or three) segments and the charged power during any time when the output of the solar battery is low, for example, during the night, before sunset, after sunrise, or a rainy day; reproducing the recorded video broadcasts; and retransmitting the reproduced recorded programs by use of any remaining segments, for example, segments adjacent to the central segments.

And, a rebroadcasting system for retransmitting a television broadcast, which was received from a satellite, in a segment broadcasting, such as one-segment broadcasting and three-segment broadcasting, comprises charging a solar battery during the daytime; recording broadcasts during plural time zones; retransmitting television broadcasts, which are received from the satellite, in real time by use of central (one or three) segments and the charged power during any time when the output of the solar battery is low, for example, during the night, before sunset, after sunrise, or a rainy day; reproducing simultaneously the programs recorded during the plural time zones; and retransmitting the plural simultaneously reproduced recorded programs by use of any remaining plural segments, for example, segments adjacent to the central segments.

In addition, a rebroadcasting system for retransmitting a television broadcast, which was received from a satellite, in a segment broadcasting, such as one-segment broadcasting and three-segment broadcasting, comprises charging a solar battery during the daytime; recording broadcasts during the retransmission halt time; reproducing the recorded video broadcasts by use of the charged power during any time when the output of the solar battery is low (for example, during the night, before sunset, after sunrise, or a rainy day); and retransmitting the reproduced recorded programs by use of any segment.

Advantageous Effects of the Invention

According to the present invention, a program whose broadcast is recorded during the retransmission halt time and which is retransmitted in real time when it becomes a time zone to perform the retransmission and a program recorded during the halt time are respectively retransmitted by use of a different segment. A rebroadcasting system that enables to view the program broadcast during the retransmission halt time by selecting a channel of a receiving terminal and a segment in a broadcast service area can be realized.

DESCRIPTION OF THE PREFERRED EMBODIMENTS

One embodiment according to the present invention is described with reference to FIG. 1A to FIG. 1D and FIG. 2.

Embodiment 1

Figure 1A:
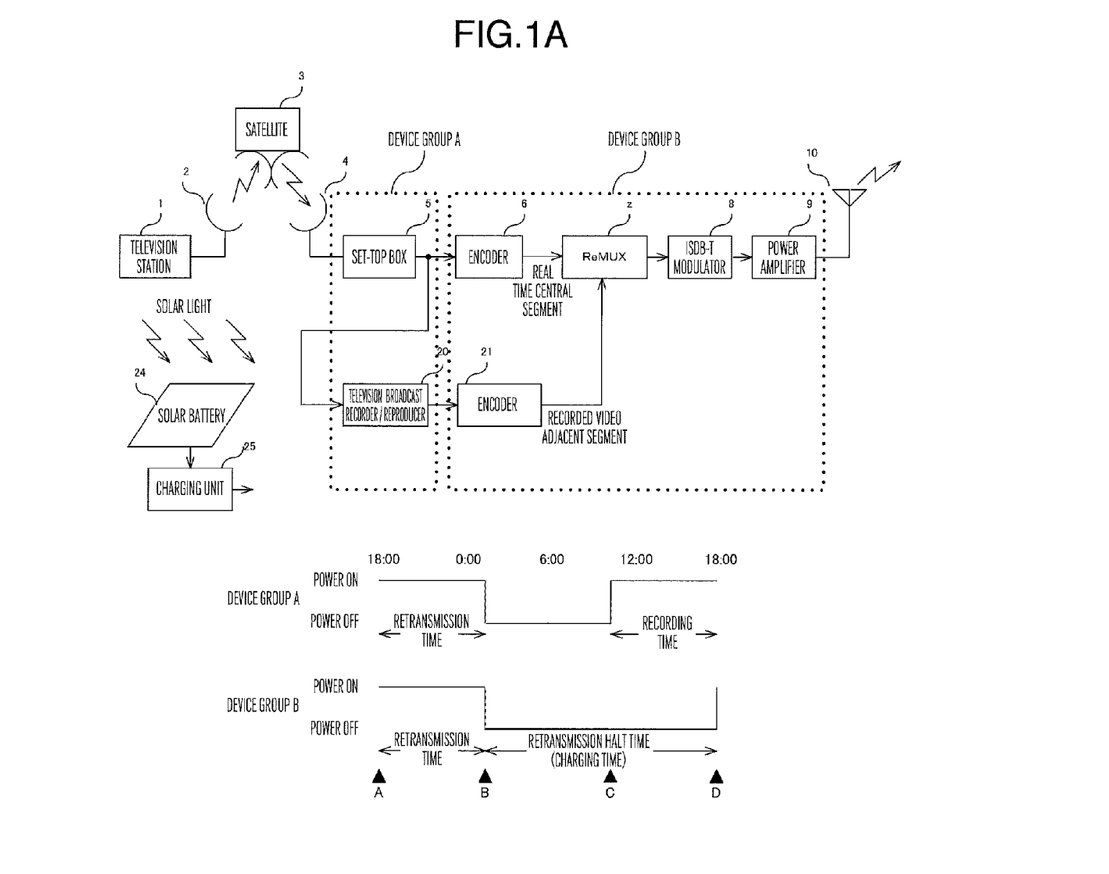
FIG. 1A is a schematic view of a configuration and a temporal control example of one embodiment of the invention.

FIG. 1A is a schematic view of a configuration and a temporal control example according to one embodiment of the invention.

Up to the output of a set-top box 5 is the same as in FIG. 4 which is a block diagram showing a configuration of a one-segment retransmission system for a conventional satellite broadcasting of prior art.

A program is transmitted from a television station 1 and television broadcasting waves are transmitted to a satellite 3 by an antenna 2. The received signal is retransmitted by the satellite to each region and received as television broadcast by a shared receiving antenna 4 and a set-top box 5. Video and audio of the program obtained by the set-top box are input to an encoder 6 and converted by a ReMUX 7 into a signal form (broadcasting TS) conforming to the ISTD-T system. The broadcasting TS is modulated by an ISDB-T modulator 8 and allotted to one central segment of the channel. Thus, the retransmission signal modulated to one segment is transmitted to a one-segment receiving terminal of each home or portable terminals via a power amplifier 9 and a transmitting antenna 10.

The signal obtained from the set-top box 5 is divided into a system via a television broadcast recorder/reproducer 20 and an encoder 21, and a system via the encoder 6. For example, a charging time from a solar battery 24 to a charging unit 25 during the daytime is controlled such that the encoder and subsequent devices are stopped to deliver the power for charging from the solar battery 24 to the charging unit 25. At this time, the set-top box 5 and the television broadcast recorder/reproducer 20 are kept operating to record the program during the daytime. When it becomes the retransmission time of the television broadcast, the encoder and subsequent devices are operated. In accordance with the above, the video recording operation of the television broadcast recorder/reproducer 20 is stopped, and reproduction of the recorded program is started. The recorded video program reproduced from the television broadcast recorder/reproducer 20 is input to and encoded by the encoder 21 (defined as program A). On the other hand, the output of the set-top box 5 is input to the encoder 6 to encode the real time program (program B). The encoded results of the program A and the program B are input to the ReMUX 7 to multiplex the programs A, B so as to generate the broadcasting TS. Regarding the multiplexing of the programs, for example, the program B is allotted to one central segment of the channel, and the other program A is allotted to any one segment in the remaining 12 segments to perform multiplexing. The operation of the ReMUX 7 and later is omitted because it is the same as prior art.

In FIG. 1A which is a schematic view of a configuration and a temporal control example according to one embodiment of the present invention, a case assuming that a television broadcast is retransmitted for seven hours from 18:00 is considered. When it becomes 18:00 (time A), power sources of device groups A, B from the charging unit 25 are turned on, and television broadcasts in real time and of the recorded video are retransmitted. When it becomes 1:00 (time B) in the midnight, retransmission of the television broadcasts is stopped, and the power sources of the device groups A, B are turned off to suppress waste of power. The power source of the device group A from the solar battery 24 is turned on at 11:00 A.M. (Time C), and recording of television broadcast is started and continued for seven hours. At this time, the device group B is kept with the power source OFF, and a minimum operation is performed so to deliver the power for charging the solar battery while suppressing power consumption. At 18:00 (time D), the power sources of the device groups A, B from the charging unit 25 are turned on to start television retransmission. Thus, the power consumption of the device during the charging time is suppressed. The broadcast time may be varied depending on an area or suppliable power.

Thus, the real time broadcast and the recorded video broadcast are output simultaneously at the retransmission time, so that broadcasting during the retransmission halt time can also be transmitted, and services and channels can be increased even when no large system is added or changed.

In the above example, the programs A, B which were respectively allotted to different segments and retransmitted were described. ISDB-T (ISDB-Tsb) has a concept that services (programs) of the same segment are multiplexed. For example, it is also possible to realize by using three segments at the center of the channel to multiplex the programs A, B to the three segments, and transmitting as multichannels.

Embodiment 2

Embodiment 2 is a rebroadcasting system for retransmitting a television broadcast, which was received from a satellite, in a segment broadcasting, such as one-segment broadcasting and three-segment broadcasting, comprising charging a solar battery during the daytime; recording broadcasts in plural time zones; retransmitting television broadcasts, which are received from the satellite, in real time by use of central (one or three) segments and the charged power during any time when the output of the solar battery is low, for example, during the night, before sunset, after sunrise, or a rainy day; reproducing simultaneously the programs recorded in plural time zones; and retransmitting the plural simultaneously reproduced recorded programs by use of any remaining plural segments such as segments vertically adjacent to the central segments.

Figure 1B:
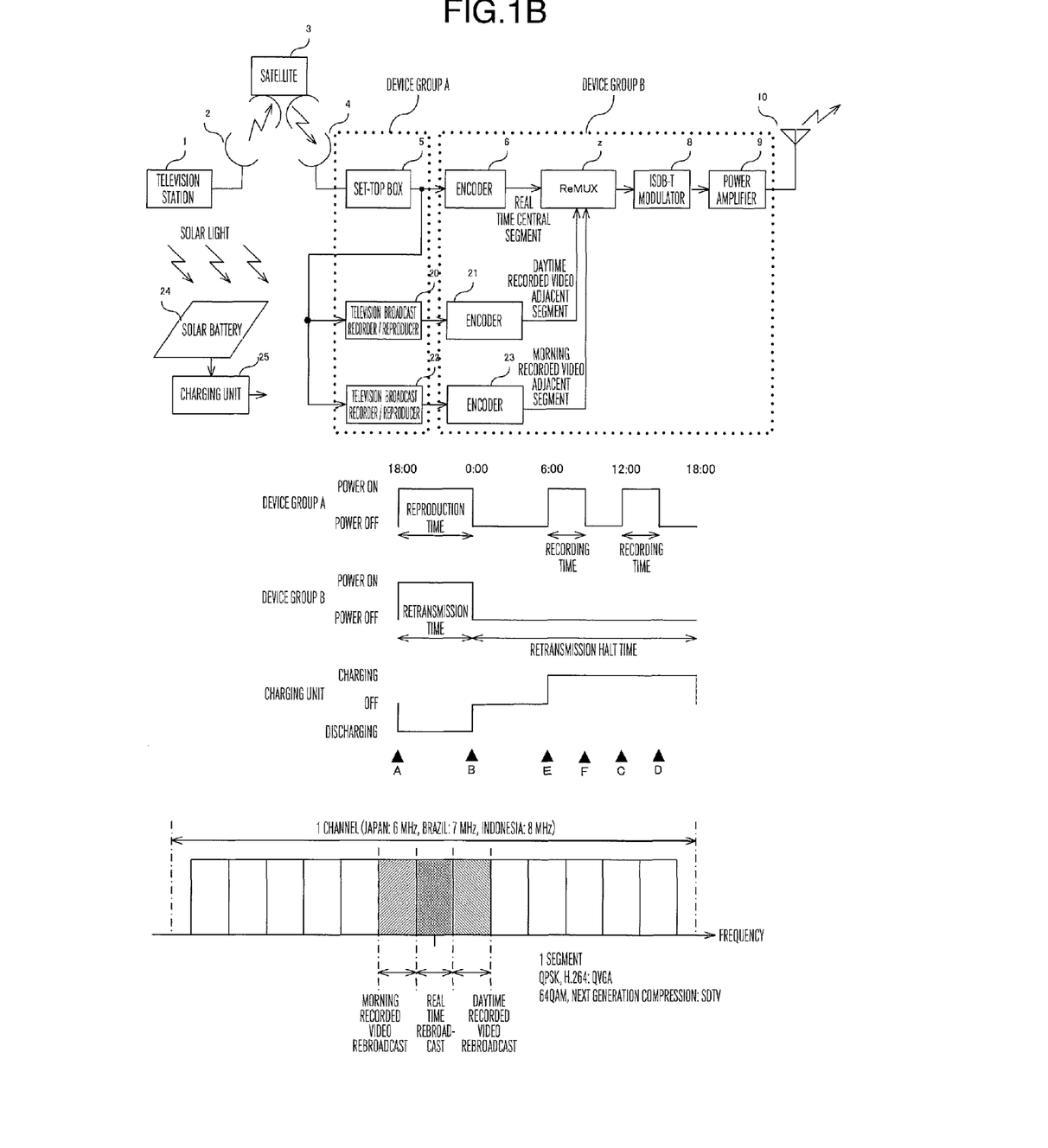
FIG. 1B is a schematic view of a configuration, a temporal control example and a digital terrestrial broadcast channel of another embodiment of the invention (in 1 segment of a 6 MHz channel, QVGA when H.264 by QPSK, and SDTV by the next generation video encoding technology of H.265 by 64QAM).
Figure 1C:
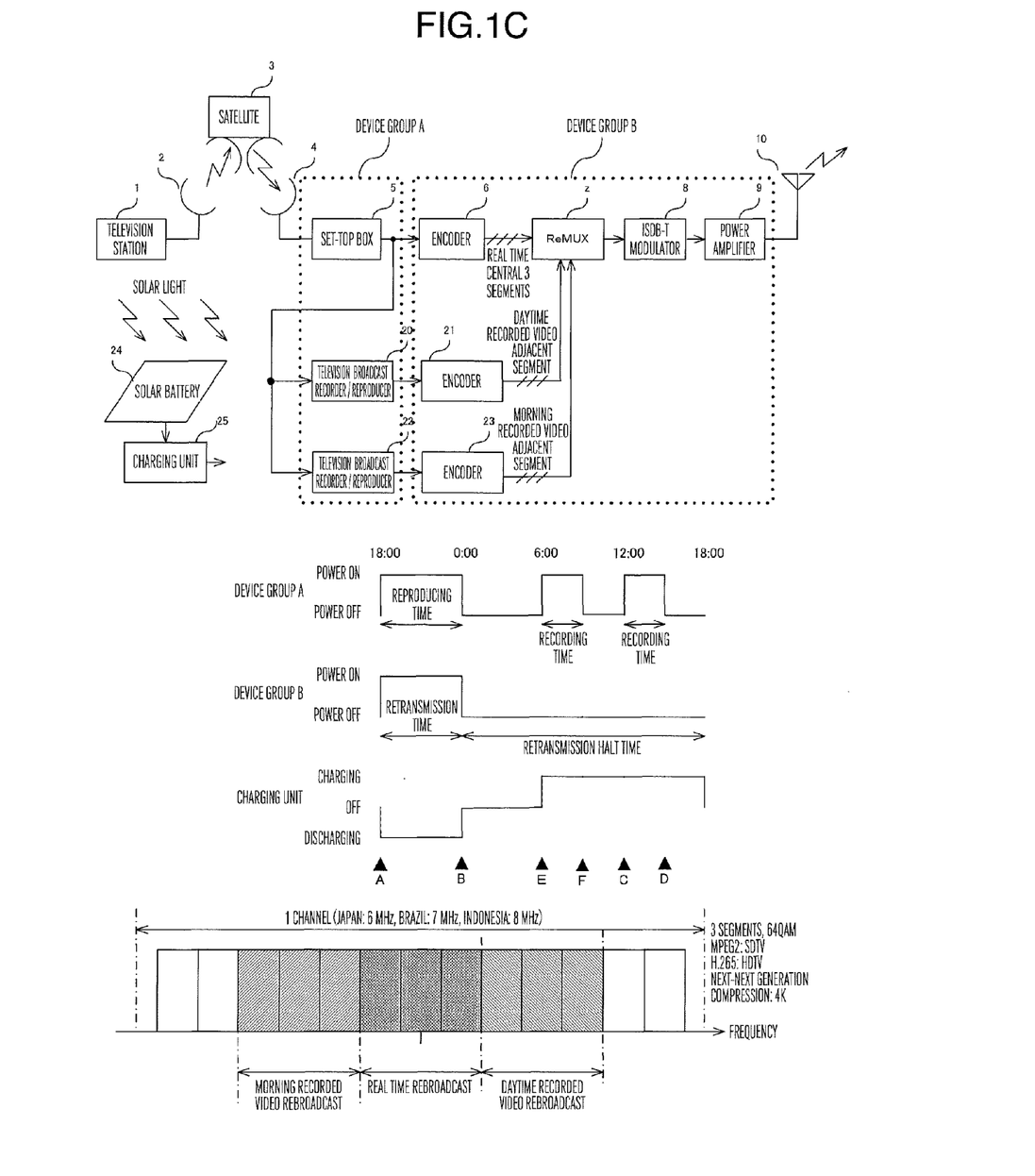
FIG. 1C is a schematic view of a configuration, a temporal control example and a digital terrestrial broadcast channel of another embodiment of the invention (in 3 segments of a 6 MHz channel by 64QAM, SDTV by MPEG2, HDTV by H.265, and 4 K by the video encoding technology which is next-next generation of H.265)

FIG. 1B shows a schematic view of a configuration, a temporal control example and a digital terrestrial broadcast channel of another embodiment of the present invention (in 1 segment of a 6 MHz channel, QVGA when H.264 by QPSK, and SDTV by the next generation video encoding technology of H.265 by 64QAM). And, FIG. 1C shows a schematic view of a configuration, a temporal control example and a digital terrestrial broadcast channel of another embodiment of the present invention (in 3 segments of a 6 MHz channel by 64QAM, SDTV by MPEG2, HDTV by H.265, and 4 K by the video encoding technology which is next-next generation of H.265).

Description is omitted because of similarity to the block diagram showing the configuration of one embodiment of the present invention of FIG. 1A excepting a configuration that a television broadcast recorder/reproducer 22 and an encoder (for transmission of recorded programs) 23 were added.

A case assuming that a television broadcast is retransmitted for six hours from 18:00 is considered. When it becomes 18:00 (time A) in the evening, the power sources of the device groups A, B from the charging unit 25 are turned on, and television broadcasts in real time, of the recorded videos taken during the morning and of the recorded videos taken during the daytime are retransmitted. When it becomes 0:00 (time B) in the midnight, retransmission of the television broadcasts is stopped, the power sources of the device groups A, B from the charging unit 25 are turned off to suppress waste of power. The power source of the device group B is kept OFF from 6:00 (time E) to 9:00 (time F) in the morning, and the power source of the device group A from the solar battery 24 or the charging unit 25 is turned on to record the television broadcast for three hours. The power source of the device group B is kept OFF from 12:00 (time C) to 15:00 (time D) during the daytime, and the power source of the device group A from the solar battery 24 is turned on to record the television broadcast for three hours. At this time, the power source of the device group B is kept OFF, and a minimum operation is performed so to deliver the power for charging from the solar battery 24 to the charging unit 25 while suppressing power consumption. At 18:00 (time D) in the evening, the power sources of the device groups A, B from the charging unit 25 are turned on to start retransmission of television.

That is, the three-hour recorded video is reproduced two times.

The retransmission of television may be started not only in the night but also in any time when the output of the solar battery is low, such as before sunset, after sunrise, or a rainy day.

Embodiment 3

Embodiment 3 is a rebroadcasting system for retransmitting a television broadcast, which was received from a satellite, in a segment broadcasting, such as one-segment broadcasting and three-segment broadcasting, comprising charging a solar battery during the daytime; recording broadcasts during the retransmission halt time; reproducing the recorded video broadcasts by use of the charged power during the nighttime; and retransmitting the reproduced recorded programs by use of any segment.

Figure 1D:
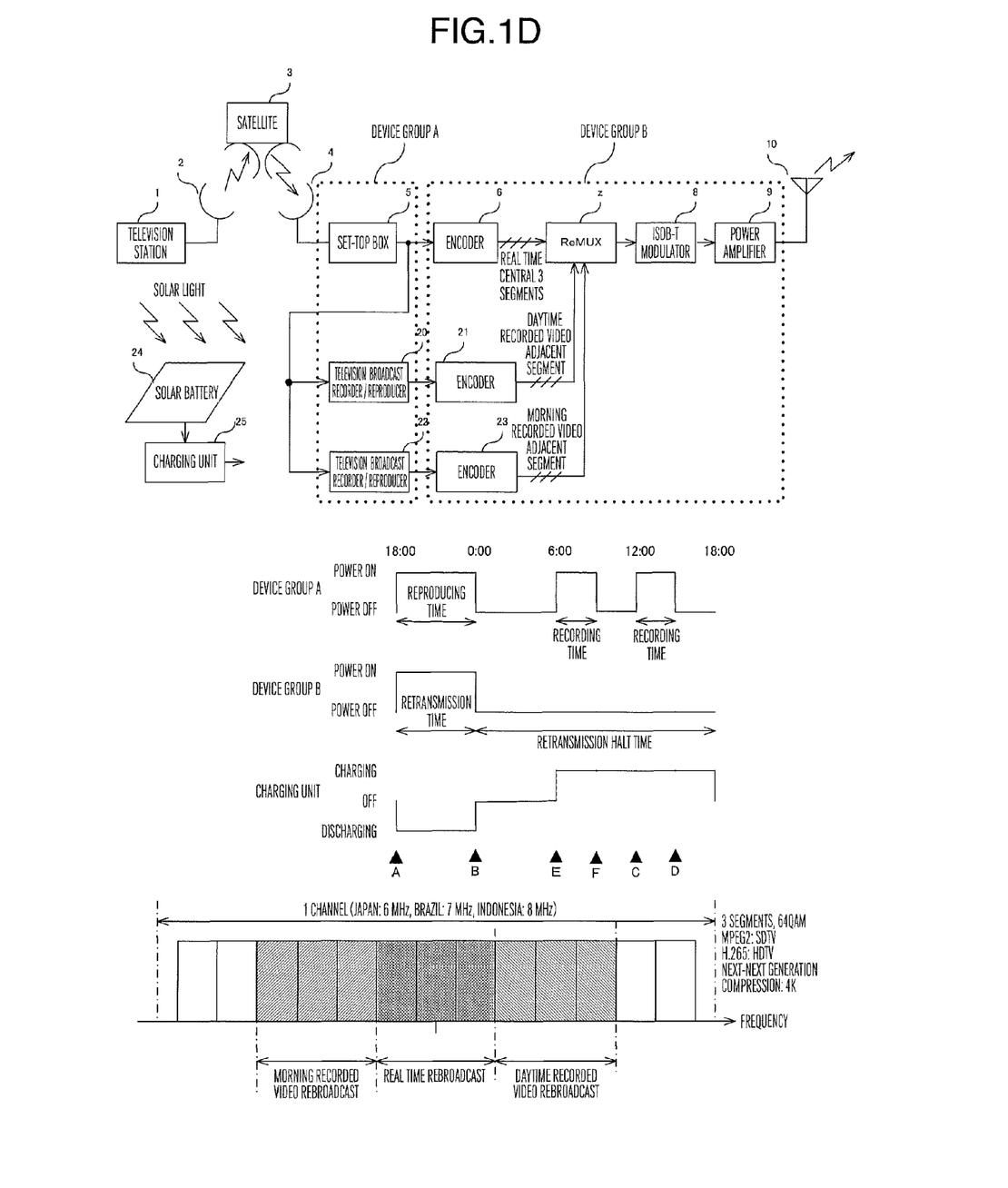
FIG. 1D is a schematic view of a configuration, a temporal control example and a digital terrestrial broadcast channel of another embodiment of the invention (rebroadcasting of one-segment recorded video only).

FIG. 1D shows a schematic view of a configuration, a temporal control example and a digital terrestrial broadcast channel of another embodiment of the invention (rebroadcast of one-segment recorded video only)).

Description is omitted because of similarity to the block diagram showing the configuration of one embodiment of the present invention of FIG. 1A excepting that television broadcast recorder/reproducers 22 and 24 and an encoder 23 (for transmission of recorded programs) were added, and the input of the encoder 6 was changed from the output of the set-top box 5 to the output of the television broadcast recorder/reproducer 24.

A case assuming that a television broadcast is retransmitted for six hours from 19:00 in the night is considered. When it becomes 19:00 (time A) in the night, the power sources of the device groups A, B from the charging unit 25 are turned on, and television broadcasts in real time, of the recorded videos taken during the morning and of the recorded videos taken during the daytime are retransmitted. When it becomes 1:00 (time B) in the midnight, the retransmission of the television broadcasts is stopped, and the power sources of the device groups A, B are turned off to suppress waste of power. The power source of the device group B is kept OFF from 6:00 (time E) to 8:00 (time F) during the morning, and the power source of the device group A from the solar battery 24 or the charging unit 25 is turned on to record the television broadcast for two hours. The power source of the device group B is kept OFF from 12:00 (time C) to 14:00 (time D) during the daytime, and the power source of the device group A from the solar battery 24 is turned on to record the television broadcast for two hours. At this time, the power source of the device group B is kept OFF, and a minimum operation is performed so to deliver the power for charging from the solar battery 24 to the charging unit 25 while suppressing power consumption. The power source of the device group B is kept OFF from 17:00 (time G) to 19:00 (time H) in the evening, and the power source of the device group A from the charging unit 25 is turned on to record the television broadcast for two hours. At this time, the power source of the device group B is kept OFF, and a minimum operation is performed so to deliver the power for charging from the solar battery 24 to the charging unit 25 while suppressing power consumption.

The power sources of the device groups A, B from the charging unit 25 are turned on at 19:00 (time D) in the night, and retransmission of television is started with the recorded video taken in the morning determined as a central segment, the recorded video taken in the daytime as a central adjacent segment, and the recorded video taken in the evening as a central reverse adjacent segment. The two-hour recorded video is reproduced three times.

The retransmission of television may be started not only in the night but also in any time when the output of the solar battery is low, such as before sunset, after sunrise, or a rainy day.

First, a distance of 64QAM can also be extended by improvement of four-diversity reception at the four corners of a large screen. Therefore, the present invention can be applied not only to QPSK only of one-segment broadcasting which is used for broadcasting toward portable terminals, but also to 64QAM. In addition, when an organic EL image receiver is commercialized, large screen reception by solar power generation and a rechargeable battery also becomes easy. Therefore, the present invention can also be applied not only to one-segment relay broadcasting, but also to relay broadcasting of SDTV, and HDTV of 1080/60i, 1080/50i, 720/60p or 720/50p.

Figure 2:
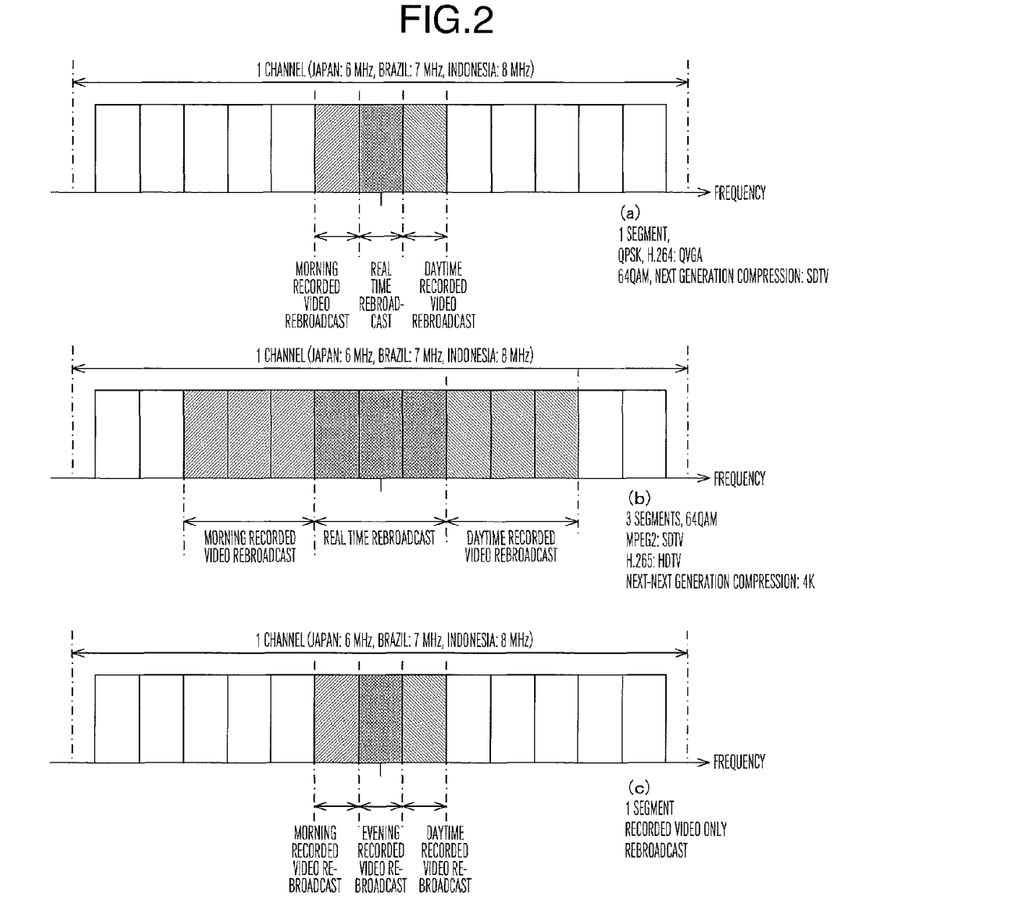
FIG. 2 is a schematic view of a channel of a one-segment retransmission system for satellite broadcasting of one embodiment of the invention.

Here, in a schematic view of relay broadcasting of a segment in a terrestrial broadcast channel according to one embodiment of the invention of FIG. 2, there are 13 segments at 428 kHz when 6 MHz is divided into 14 in Japan and old NTSC (National Television System Committee) region, 13 segments at 500 kHz when 7 MHz is divided into 14 in most of EU and old PAL (Phase Alternation by Line) region and most of old SECAM (Sequential Couleur a Memoire) region, and 13 segments at 571 kHz when 8 MHz is divided into 14 in parts of Indonesia and old PAL region and parts of old SECAM region. In other words, the segment band is proportional to the channel band, and the number of segments is 13.

And, the necessary transmission band in 3:1:0 sampling by 64QAM of digital terrestrial broadcast becomes a half with H.264 and ¼ with HEVC (High Efficiency Video Codec) having H.265 with respect to MPEG-2 with the improvement of video encoding technology. In a case of the next generation video encoding technology of H.265, it is predicted to become H.266 which is ⅛ with respect to MPEG-2, and to become H.267 which is ⅛ with respect to MPEG-2 by the video encoding technology which is next-next generation of H.265.

Therefore, in the necessary transmission band of 1080/60i, MPEG-2 has 5.14 MHz (12 segments) made to 1.29 MHz by HEVC. Transmission can be made by three segments 1.29 MHz in 428 kHz segment of a 6 MHz channel in Japan or the old NTSC region.

And, the necessary transmission band of 1080/50i is 4.285 MHz according to MPEG-2 and becomes 1.071 MHz by HEVC, and a 571 kHz segment of an 8 MHz channel can be transmitted by 2 segments in Indonesia, a part of the old PAL region or a part of the old SECAM region. A 500 kHz segment of a 7 MHz channel in EU, most of the old PAL region or most of the old SECAM region can be transmitted by 3 segments 1.5 MHz. By the next generation video encoding technology making ⅛ with respect to MPEG-2, the necessary transmission band of 1080/50i becomes 536 kHz, and a 571 kHz segment of the 8 MHz channel can be transmitted by one segment in Indonesia, a part of the old PAL region or a part of the old SECAM region.

Incidentally, by 64QAM of digital terrestrial broadcast, the necessary transmission band of SDTV is 1.71 MHz (4 segments) according to MPEG-2 and becomes 428 kHz by HEVC. Even in the 6 MHz channel in Japan, the 7 MHz channel in EU, or the 8 MHz channel in Indonesia, transmission can be made by 1 segment by 64QAM.

And, transmission can be made to 1080/50i by HEVC by 2 segments 1 MHz or less in 500 kHz segments of the 7 MHz channel using an LDPC (Low Density Parity Check) code. By the next generation video encoding technology having ⅛ with respect to MPEG-2, transmission can be made by 1 segment in the 500 kHz segments of the 7 MHz channel.

In addition, even with 1080/60i, transmission can be made by 2 segments 856 kHz or less in 428 kHz segments of the 6 MHz channel in polarization MIMO (Multi In Multi Out).

And, when a loss of the high-speed transmission optical cable reduces, it also becomes easy to install parasitic submarine optical cables for islands. Therefore, the present invention can be applied not only to relay broadcasting for receiving satellite broadcasts, but also to relay broadcasting for optical cable receiving.

INDUSTRIAL APPLICABILITY

According to the present invention, a system for retransmitting satellite broadcasting in real time enables to view a broadcasted program during the retransmission halt time without missing the broadcast even if the retransmission halt time occurs when the retransmission time is limited to any time when the output of a solar battery is low, such as during the night, before sunset, after sunrise, or a rainy day.

What is claimed is:

1. A rebroadcasting system for retransmitting a television broadcast received from a satellite, in a segment broadcast such as one-segment broadcast and three-segment broadcast, comprising:
   a charging unit configured to charge a solar battery during daytime;
   a television broadcast recorder and reproducer configured to record the broadcast during a retransmission halt time;

a retransmitter configured to retransmit the television broadcast received from the satellite in real time by use of central (one or three) segments, with power charged in the solar battery during any time when an output of the solar battery is low;

the television broadcast recorder and reproducer configured to reproduce the recorded broadcast; and the retransmitter configured to retransmit the reproduced recorded program by use of any remaining segments such as segments adjacent to the central segments.

2. A rebroadcasting system for retransmitting a television broadcast received from a satellite, in a segment broadcasting such as one-segment broadcasting and three-segment broadcasting, comprising:

a charging unit configured to charge a solar battery during daytime;

a television broadcast recorder and reproducer configured to record the broadcast during plural time zones;

a retransmitter configured to retransmit the television broadcast received from the satellite in real time by use of central (one or three) segments, with power charged in the solar battery during any time when an output of the solar battery is low;

the television broadcast recorder and reproducer configured to reproduce simultaneously programs recorded during plural time zones; and the retransmitter configured to retransmit the plural simultaneously reproduced recorded programs by use of any remaining plural segments such as segments adjacent to the central segments.

3. A rebroadcasting system for retransmitting a television broadcast received from a satellite, in a segment broadcast such as one-segment broadcast and three-segment broadcast, comprising:

means for charging a solar battery during daytime, and means for recording broadcasts during a retransmission halt time; and means for reproducing the recorded broadcast with power charged in the solar battery during any time when an output of the solar battery is low, and means for retransmitting the reproduced recorded program by use of any segment.

4. The rebroadcasting system of claim 1, wherein:

the television broadcast recorder and reproducer is inactivated during a morning of the daytime to conserve energy and facilitate charging of the solar battery; and the television broadcast recorder and reproducer is activated during an afternoon of the daytime to record the broadcast during the retransmission halt time.

5. The rebroadcasting system of claim 2, wherein:

the television broadcast recorder and reproducer is inactivated during a morning of the daytime to conserve energy and facilitate charging of the solar battery; and the television broadcast recorder and reproducer is activated during an afternoon of the daytime to record the broadcast.

6. The rebroadcasting system of claim 3, wherein:

the means for recording broadcasts includes a television broadcast recorder and reproducer;

the means for reproducing the recorded broadcasts includes the television broadcast recorder and reproducer;

the television broadcast recorder and reproducer is inactivated during a morning of the daytime to conserve energy and facilitate charging of the solar battery; and the television broadcast recorder and reproducer is activated during an afternoon of the daytime to record the broadcast during the retransmission halt time.

* * * * *